US010803014B2

(12) United States Patent
Jain et al.

(10) Patent No.: US 10,803,014 B2
(45) Date of Patent: Oct. 13, 2020

(54) DYNAMIC DATA RELATIONSHIPS IN A GRAPH DATABASE

(71) Applicant: ADP, LLC, Roseland, NJ (US)

(72) Inventors: Lucky Ratanlal Jain, Jersey City, NJ (US); Osman Ozdemir, East Northport, NY (US); Adrian Michael Garza, New York, NY (US); Dennis Peter Mohan, New York, NY (US); Shia Kaufman, New York, NY (US); Meir Rosner, New York, NY (US); Siobhan Loughman Sabino, Manalapan, NJ (US); Kuntal Roy, North Brunswick, NJ (US); Michael Hirawady, Florham Park, NJ (US)

(73) Assignee: ADP, LLC, Roseland, NJ (US)

( * ) Notice: Subject to any disclaimer, the term of this patent is extended or adjusted under 35 U.S.C. 154(b) by 271 days.

(21) Appl. No.: 15/663,526

(22) Filed: Jul. 28, 2017

(65) Prior Publication Data

US 2019/0034425 A1    Jan. 31, 2019

(51) Int. Cl.
| | | |
|---|---|---|
| *G06F 7/00* | (2006.01) | |
| *G06F 17/00* | (2019.01) | |
| *G06F 16/16* | (2019.01) | |
| *G06Q 10/06* | (2012.01) | |
| *G06F 16/248* | (2019.01) | |
| *G06F 16/22* | (2019.01) | |
| *G06F 16/901* | (2019.01) | |

(52) U.S. Cl.
CPC ........ *G06F 16/164* (2019.01); *G06F 16/2228* (2019.01); *G06F 16/248* (2019.01); *G06F 16/9024* (2019.01); *G06Q 10/063112* (2013.01)

(58) Field of Classification Search
None
See application file for complete search history.

(56) References Cited

U.S. PATENT DOCUMENTS

| | | |
|---|---|---|
| 7,711,599 B1 | 5/2010 | Libman |
| 8,312,056 B1 | 11/2012 | Peng et al. |
| 8,370,362 B2 | 2/2013 | Szabo |
| 8,646,060 B1 | 2/2014 | Ben Ayed |
| 8,719,243 B2 | 5/2014 | Tobin et al. |
| 8,972,467 B2 * | 3/2015 | Heinrich ............. H04L 67/1095 345/661 |

(Continued)

OTHER PUBLICATIONS

"Advantages of a Risk Based Authentication Strategy for MasterCard Securecode", MasterCard, Jun. 2011, 12 pages.

(Continued)

*Primary Examiner* — Tuan A Pham
(74) *Attorney, Agent, or Firm* — Yee & Associates, P.C.

(57) ABSTRACT

Improving data retrieval by a computer, the data stored exclusively in the computer as a structure comprising a plurality of nodes connected by edges, wherein the edges indicate relationships among the plurality of nodes, and wherein the structure further comprise properties which store information that relate to the plurality of nodes. Metadata is stored as part of the structure, the metadata defining rules for updating the relationships among the plurality of nodes. A command is received to update at least one of the nodes, the edges, or the properties. The at least one of the nodes, the edges, or the properties, are updated according to the rules defined by the metadata.

21 Claims, 13 Drawing Sheets

(56) References Cited

U.S. PATENT DOCUMENTS

| | | | |
|---|---|---|---|
| 2006/0059027 A1* | 3/2006 | Berenbach | G06F 17/50 717/104 |
| 2007/0143832 A1 | 6/2007 | Perrella et al. | |
| 2008/0086759 A1* | 4/2008 | Colson | G06F 21/34 726/2 |
| 2011/0225625 A1 | 9/2011 | Wolfson et al. | |
| 2012/0060207 A1 | 3/2012 | Mardikar et al. | |
| 2012/0331134 A1* | 12/2012 | Lynn | G06F 16/2458 709/224 |
| 2013/0006738 A1 | 1/2013 | Horvitz et al. | |
| 2013/0191416 A1* | 7/2013 | Lee | G06F 16/2457 707/771 |
| 2013/0282486 A1* | 10/2013 | Rahle | G06F 3/048 705/14.53 |
| 2014/0046934 A1* | 2/2014 | Zhou | G06F 16/24526 707/723 |
| 2014/0129420 A1 | 5/2014 | Howe | |
| 2014/0130127 A1 | 5/2014 | Toole et al. | |
| 2014/0194208 A1* | 7/2014 | Splaine | G06Q 30/02 463/42 |
| 2014/0280307 A1* | 9/2014 | Gupta | G06F 16/3331 707/769 |
| 2014/0289790 A1* | 9/2014 | Wilson | G06Q 20/42 726/1 |
| 2015/0089409 A1 | 3/2015 | Asseily et al. | |
| 2015/0113060 A1* | 4/2015 | Wahi | H04L 65/403 709/204 |
| 2015/0205589 A1* | 7/2015 | Dally | G06F 8/4432 717/156 |
| 2016/0205122 A1* | 7/2016 | Bassett | G06F 21/577 726/23 |
| 2016/0371352 A1* | 12/2016 | Kohlmeier | G06Q 10/10 |
| 2017/0024488 A1 | 1/2017 | Henderson | |

OTHER PUBLICATIONS

Office Action, dated Mar. 5, 2020, regarding U.S. Appl. No. 15/429,154, 29 pages.

Final Office Action, dated Feb. 20, 2020, regarding U.S. Appl. No. 15/071,471, 18 pages.

* cited by examiner

DYNAMIC DATA RELATIONSHIPS IN A GRAPH DATABASE

BACKGROUND INFORMATION

1. Field

The present disclosure relates to improved graph databases, and in particular to graph databases which provide for dynamic data relationships such that the graph databases can automatically update themselves with new relationships.

2. Background

As used herein, databases store information exclusively in computers. A graph database is a specific type of database. A graph database has a graph structure including nodes, edges, and properties which represent and store data. Nodes store data. Properties are information that relate to nodes, and may be thought of as relationships lacking a pointer to another document. Edges represent relationships among nodes; that is, edges directly relate nodes to each other.

A graph database contrasts with a relational database. These two types of databases are distinct and use completely different principles of operation such that one cannot be compared directly to the other, except in that both store data.

For example, in relational databases, links between data are stored in the data itself, and queries search for data within the store using a join command to collect related data. In contrast, graph databases, by design, allow for retrieval of complex hierarchical structures that cannot be modeled in relational databases by traversing nodes and edges in the graph.

SUMMARY

The illustrative embodiments provide for improving data retrieval by a computer, the data stored exclusively in the computer as a structure comprising a plurality of nodes connected by edges, wherein the edges indicate relationships among the plurality of nodes, and wherein the structure further comprise properties which store information that relate to the plurality of nodes. Metadata is stored as part of the structure, the metadata defining rules for updating the relationships among the plurality of nodes. A command is received to update at least one of the nodes, the edges, or the properties. The at least one of the nodes, the edges, or the properties, are updated according to the rules defined by the metadata.

The illustrative embodiments also contemplate a computer configured to execute program code which implements this method. The illustrative embodiments also contemplate a non-transitory computer recordable storage medium storing program code, which, when executed, implements this method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
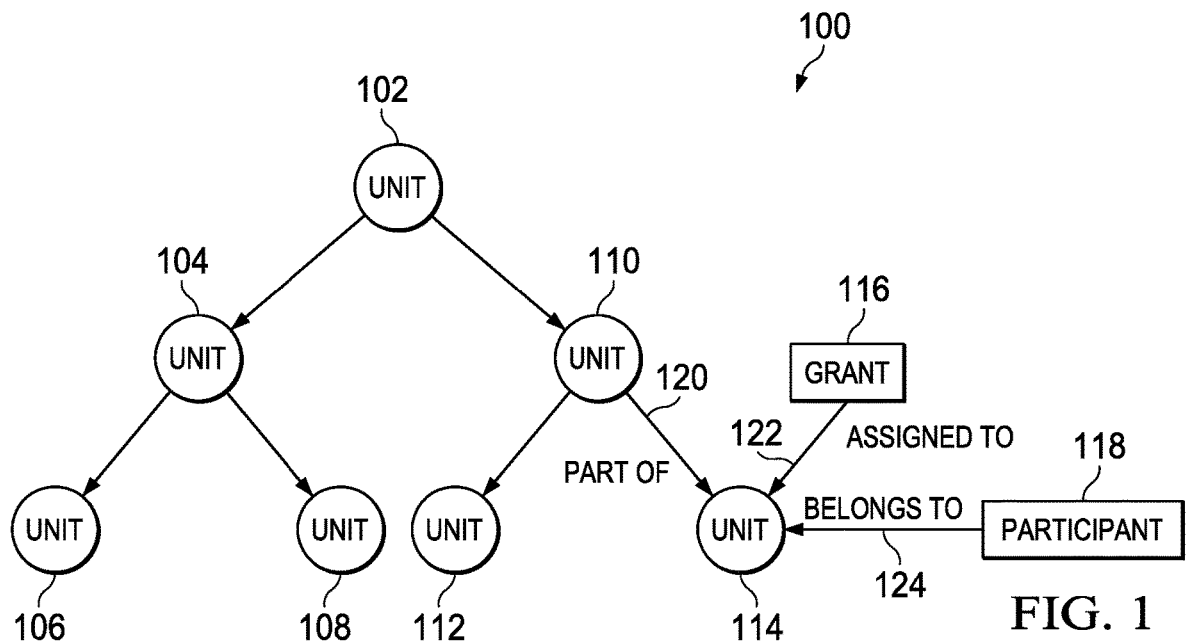
FIG. 1 is a block diagram of a novel graph database design in accordance with an illustrative embodiment.

The illustrative embodiments recognize and take into account that a typical graph database uses pre-defined relationships to maintain nodes and edges within the graph. In contrast, the illustrative embodiments provide for dynamic data relationships that improve upon this concept by creating a mechanism to dynamically define new and existing relationships via metadata.

The illustrative embodiments also recognize and take into account that current graph databases lack the ability to consume node to node relationship definition changes on the fly. The illustrative embodiments also recognize and take into account that current graph databases also lack the ability to dynamically adjust a node's relationship to another node based on the node's property value.

Thus, the illustrative embodiments provide for relationship metadata updates that are automatically consumed by the graph database. The graph database then updates itself accordingly using rules in the metadata. In addition, this mechanism also allows a node to be linked to another node in the graph database dynamically based on a node's property value. If the value changes, then the linkage between the nodes will be updated. The illustrative embodiments also create an ability to define relationships based on attributes of nodes. In this manner, the illustrative embodiments provide for dynamic data relationships in a graph database.

As an example use case, which does not limit other examples or the claimed inventions herein, consider a case where a business desires to automatically maintain membership in a particular team based on skills of team members. Currently skills data of the team members and skill requirements of being on the team could be stored in a graph database. However, a user would have to perform a query to traverse the graph, and then manually assign team members or remove team members form the team based on retrieved team skill requirements.

In the illustrative embodiments, skills are stored as part of attributes of each individual. The illustrative embodiments use user-driven criteria to automatically look for people with the required skill sets and automatically assign people to the team, or remove people form the team. If the team skill requirements change (the team is the unit in this example), then the graph database will automatically reconsider all current team assignments and look for other individuals in the database for possible inclusion in the team. Thus, the illustrative embodiments allow for automatic reassignment of team roles automatically. This feature is not possible with current graph database technology.

Stated differently, the illustrative embodiments provide for dynamic assignments of nodes based on metadata associated with the nodes. A graph database reactor is implemented to listen to changes. Attribute or metadata changes triggers a change event to be published to the data pipeline. The reactor will receive the event and adjust the graph database accordingly.

FIG. 1 is a block diagram of a novel graph database design in accordance with an illustrative embodiment. Structure 100 is an example of the novel graph databases described here and elsewhere herein. Structure 100 is stored solely on a non-transitory computer recordable storage medium and only maintained by a computer. Thus, the improved graph database of the illustrative embodiments improve data retrieval on a computer, both in terms of the kind and quality of data retrieved. The illustrative embodiments also provide for automatic maintenance of the graph database by the computer. Structure 100 has certain properties of a graph database, but structure 100 is more than a typical graph database.

In order to better understand structure 100, certain terms are now defined. As used herein, the term "structure" refers to a construct that maintains and defines relationships between units. Structure 100 may be considered an improvement of a graph database. Structure 100 may store information about a particular organization. For example, a structure could be a human resources structure, a role structure, or others. Stated succinctly, structure 100 is a collection of units, participants, and grants with defined relationships between one another. A structure may be, but does not have to be, hierarchical in structure.

As used herein, the term "unit" refers to a fundamental grouping of participants and/or grants within the structure. An example, an employee role may be a unit. The employee role (unit) may be a grouping of associates (participants) who are employees of a company in a human resources structure.

As used herein, the term "participant" is data that represents a type of actor in the structure that has a relationship to a unit. The relationship can be direct or indirect. As an example, an associate may belong to a role unit indirectly via a position held by the associate.

As used herein, the term "grant" refers to an object that has a relationship to a unit and is applied to all of the participants of the unit. As an example, authorization grants may be assigned to a role unit and applied to all associates in the role. As another example, time-off grants may be assigned to a work scheme unit.

As used herein, the term "relationship type" refers to a property between two objects in the structure that defines the relationship itself. For example, a grant has an "assigned to" relationship type with a unit. In another example, a unit may have a "part of" relationship type with another unit.

As used herein an "entity" is a set of data that defines an object, a person, or properties or relationships of the object or person. A unit may be composed of entities. An entity may be a unit in some instances, or may be a sub-unit in other instances.

Returning to FIG. 1, structure 100 includes units, such as unit 102, unit 104, unit 106, unit 108, unit 110, unit 112, and unit 114. More or different units may be present and the units may have different relationships than those shown. Units are akin to nodes in a typical graph database, but have other properties such as metadata, and may be of completely new types such as grants and participants. Thus, for example, grant 116 is a type of unit and participant 118 is a type of unit.

FIG. 1 also shows edges, as indicated by the various arrows between units, including grant 116 and participant 118. Edges depict relationships between the nodes and have labels. For example, edge 120 has a label "part of", edge 122 has a label "assigned to", and edge 124 has a label "belongs to". These edges define the relationship of unit 110 to unit 114, of grant 116 to unit 114, and participant 118 to unit 114.

Structure 100 observes certain ground rules. For example, unit to unit relationships are always at least a "part of" relationship. In another example, grant to unit relationships are always at least an "assigned to" relationship. In another example, relationships between nodes may be bi-directional. Thus, for example, a grant to unit and a unit to grant relationship are both valid.

Participant 118 is a type of unit that typically represents an actor. Participant 118 may be directly related to a unit (an employee, for example) or may be indirectly related to a unit (an associate via their position is related to a human resources unit, for example). In this scenario, the position is the direct participant, but the actor is the employee.

The types of grants can be different depending on the structure. For example, an authorization grant may be related to a role structure. A time-off grant may be related to a work structure. Other examples are possible.

Figure 2:
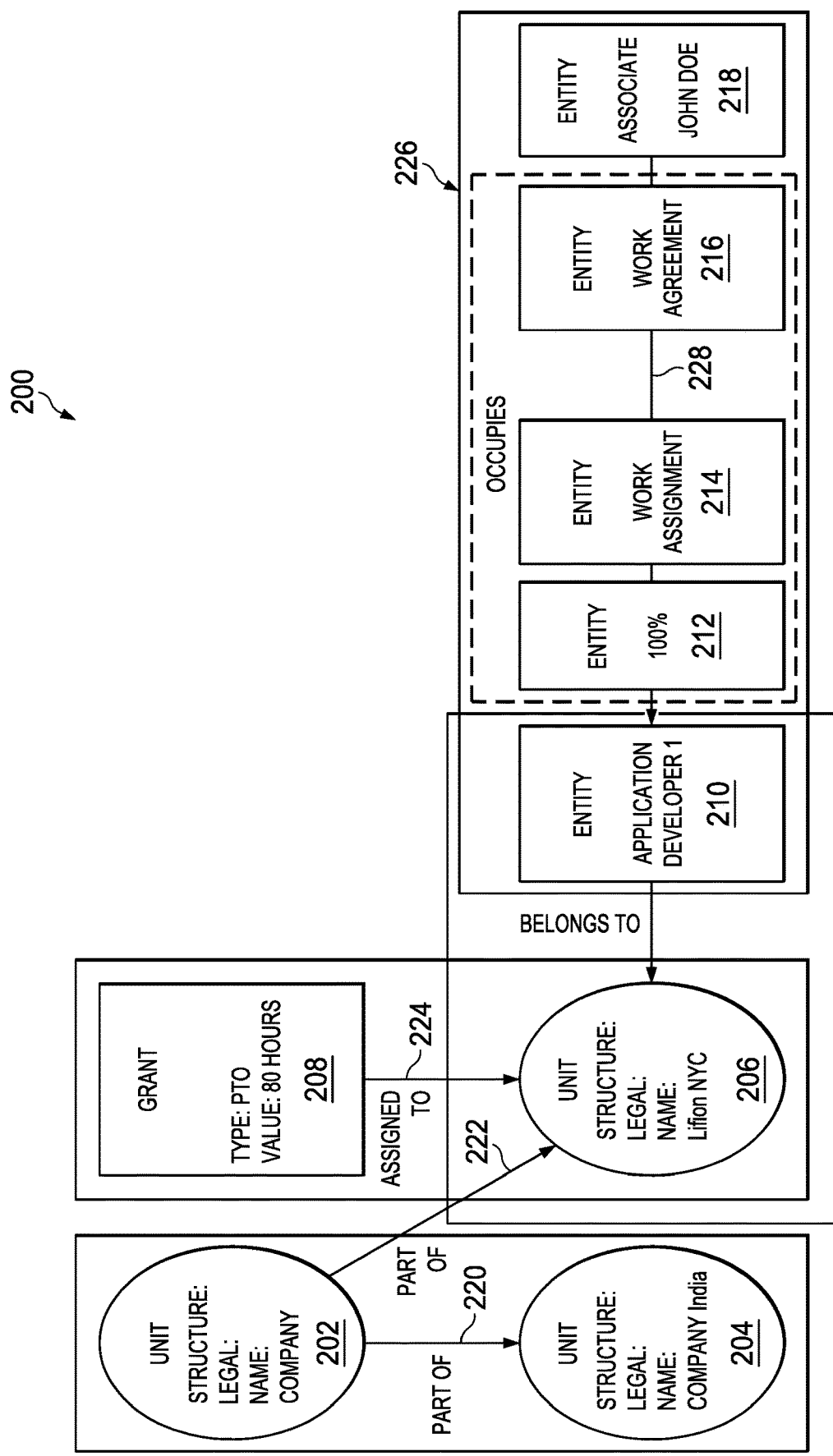
FIG. 2 is a block diagram of a specific example of a novel graph database design in accordance with an illustrative embodiment.

FIG. 2 is a block diagram of a specific example of a novel graph database design in accordance with an illustrative embodiment. Structure 200 is both an example of a structure, such as structure 100 of FIG. 1, and also an example of how to build a structure according to the illustrative embodiments.

Structure 200 includes unit 202, unit 204, and unit 206. Structure 200 also includes grant 208. Unit 206 includes a variety of entities, such entity 210, entity 212, entity 214, entity 216, and entity 218. Structure 200 also includes edges, such as edge 220, edge 222, edge 224, edge 226, and edge 228. Other edges may be present, and more or fewer units and entities may be present, and their relationships may vary. Structure 200 may be an example of a legal structure containing paid time-off grants. The various boxes surrounding the units and entities shown in FIG. 2 indicate relationships among the units and entities.

Structure 200 may be built by defining entities and models that make up structure 200. In this example, the relevant entities are unit (unit 202, unit 204, and unit 206), grant (grant 208), position (entity 210), position allocation (entity 212), work assignment (entity 214), work agreement (entity 216), and associate (entity 218). The models in structure 200 are unit-to-unit (edge 220 and edge 222), grant-to-unit (edge 224), position-to-unit (edge 226) and associate to position (edge 228).

After defining entities and models that make up structure 200, next the relationships that will make up segments of structure 200 are defined. In this example, there are four relationships: A) unit is "part of" another unit, B) grant is "assigned to" a unit, C) position "belongs to" a unit, and D) the associate "occupies" a position. The latter case is an example of an indirect participant relationship to the unit. Specifically, associate 218 is linked to the unit via his or her position, which is in turn linked via his or her work agreement, work assignment, and position allocation.

Figure 3:
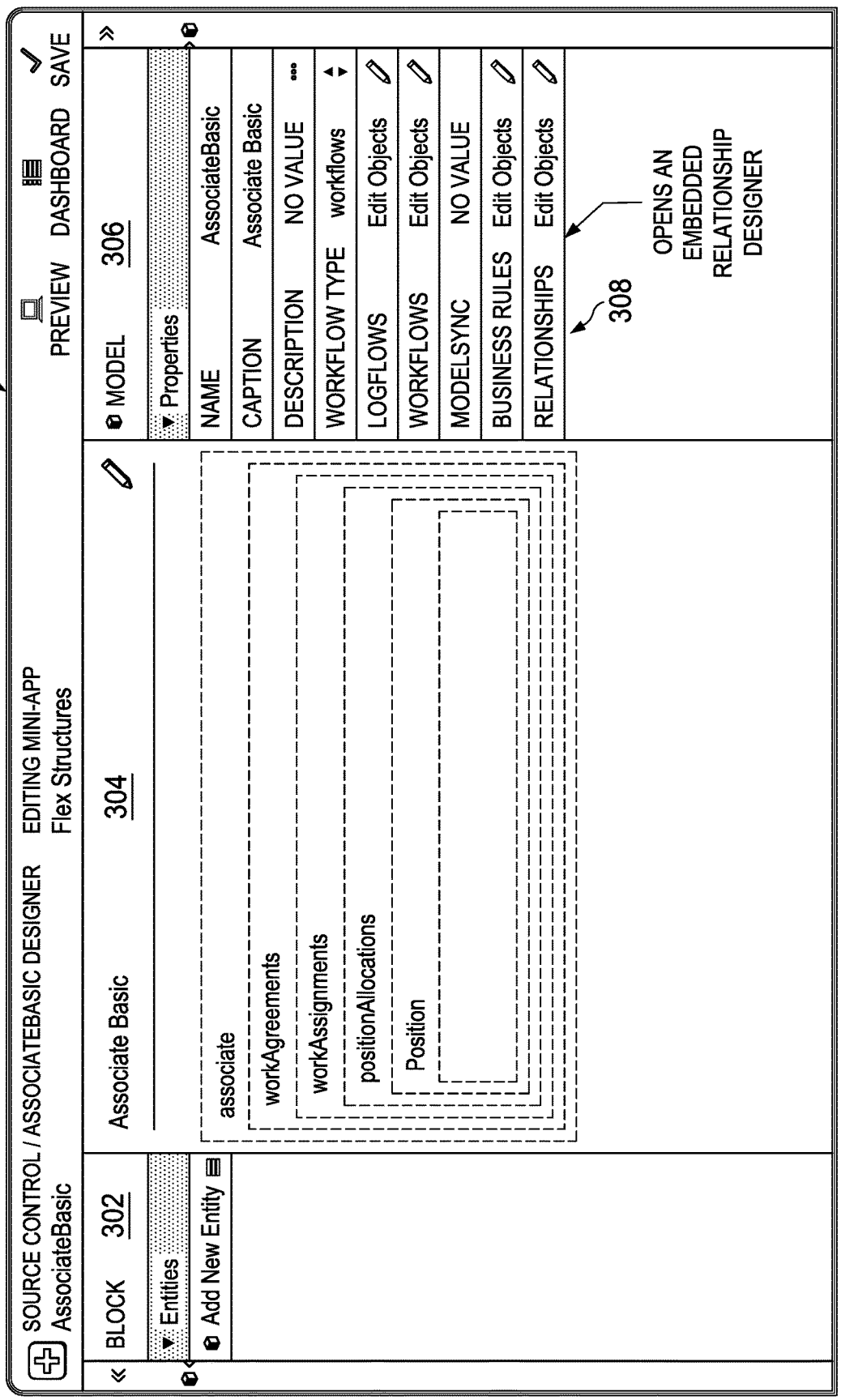
FIG. 3 is a screenshot of a sample design program for building a novel graph database in accordance with an illustrative embodiment.
Figure 4:
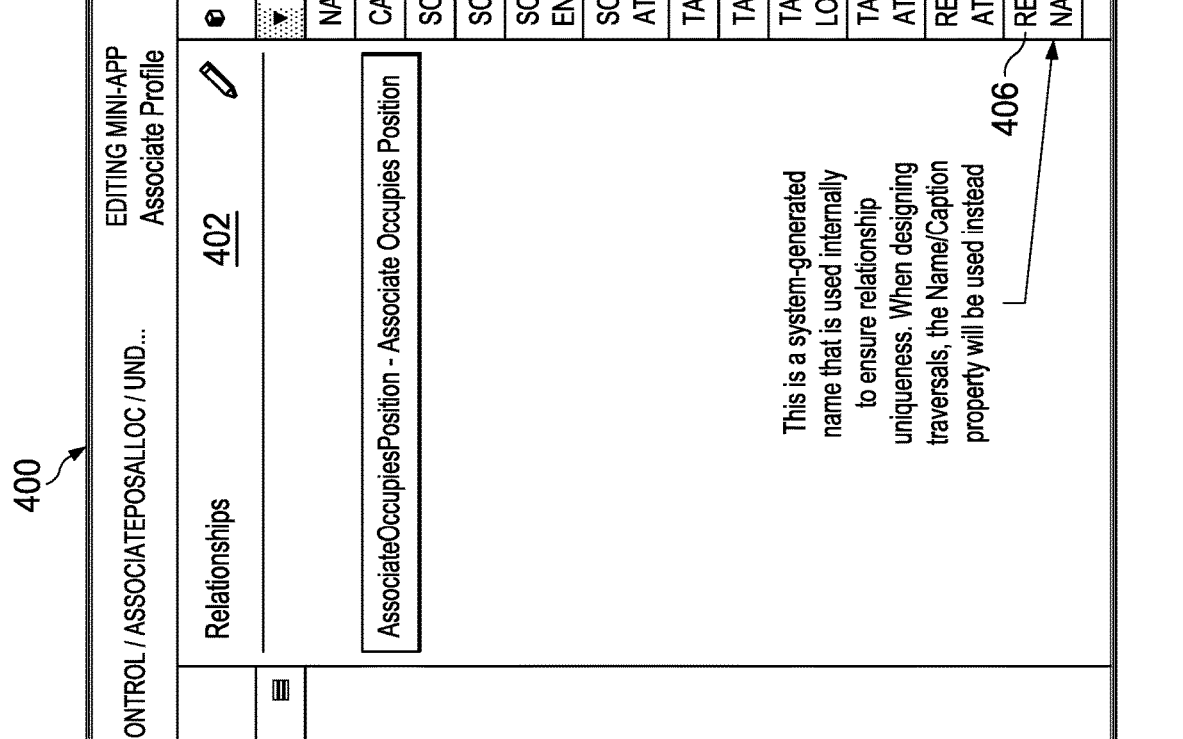
FIG. 4 is a screenshot of a sample design program for building a novel graph database in accordance with an illustrative embodiment.

FIG. 3 and FIG. 4 describe the user-facing drag and drop application used to design the structure. Designing the structure is achieved by defining the edges, or relationships, that connect two specific nodes. In this example, the relationship created will have the associate node on one end and the position node on another. A relationship edge can contain additional nodes that are not visible, such as but not limited to work agreement, work assignment, and position allocation.

FIG. 3 is a screenshot of a sample design program for building a novel graph database in accordance with an illustrative embodiment. Screenshot 300 is an example of a program that may be used to build a structure, such as structure 100 of FIG. 1 or structure 200 of FIG. 2.

As can be seen, screenshot 300 shows an interactive program in which a user can define an operable structure. A user may interact with blocks in window section 302 to manipulate entities or to add a new entity. The current entity is displayed in window section 304. Properties of models are shown in window section 306. A user may edit properties of entities either in window section 304 or window section 306. For example, a user may select button 308 in order to open an embedded relationship designer.

FIG. 4 is a screenshot of a sample design program for building a novel graph database in accordance with an illustrative embodiment. Screenshot 400, like screenshot 300 of FIG. 3, is another screenshot of a program useable to generate a structure, such as structure 100 of FIG. 1 or structure 200 of FIG. 2.

Specifically, screenshot 400 shows manipulation of relationships of an associate profile. In this example, the associate occupies a position, as shown in window section 402. Properties of the relationship may be manipulated in window section 404. Relationship attributes 406 shows a system-generated name that is used internally to ensure relationship uniqueness. When designing traversals of the structure, the name/caption property may be used instead.

Figure 5:
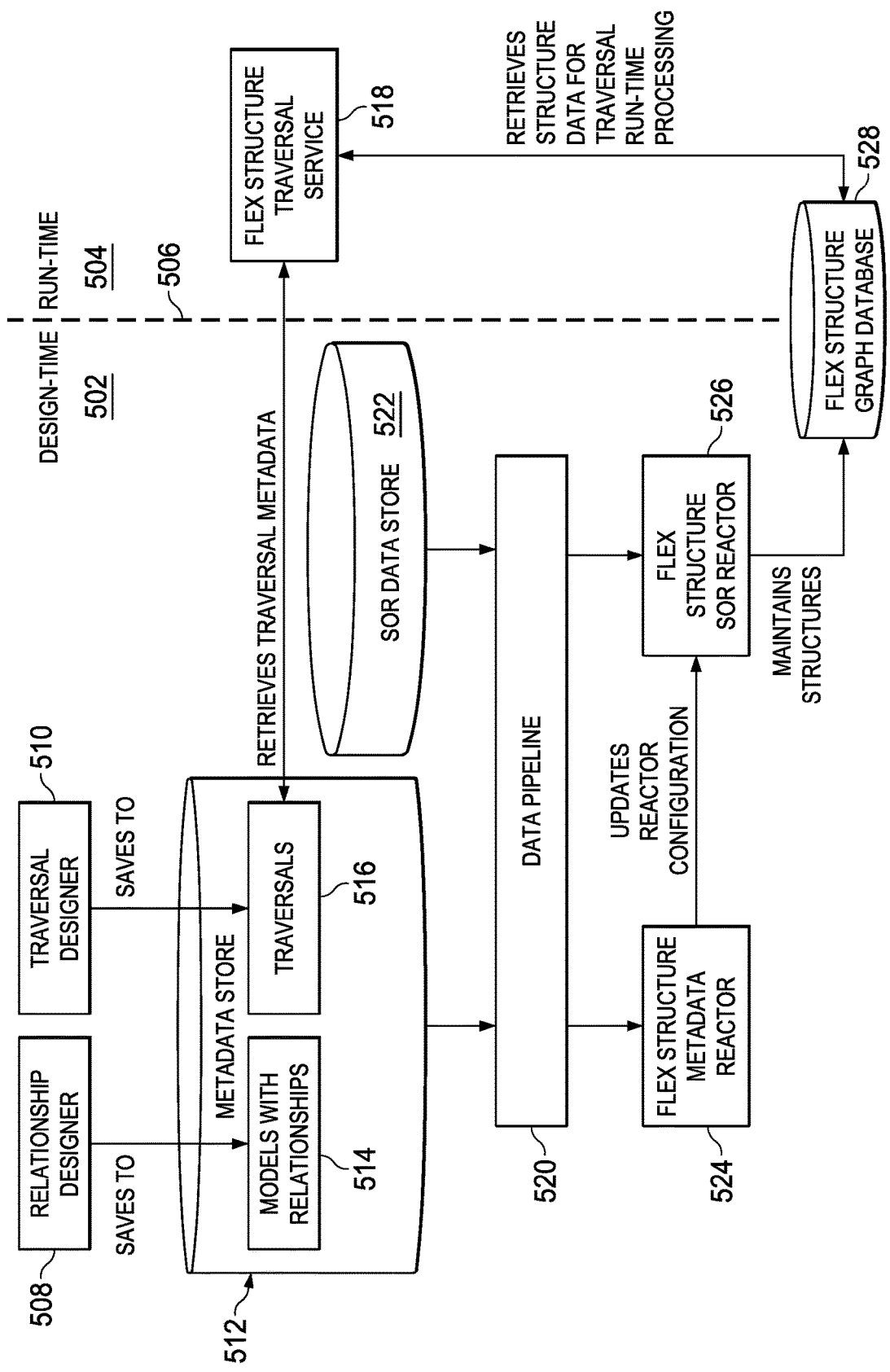
FIG. 5 is a block diagram of an architecture for a novel graph database design in accordance with an illustrative embodiment.

FIG. 5 is a block diagram of an architecture for a novel graph database design in accordance with an illustrative embodiment. Architecture 500 shows design time 502 and run-time 504 separated by dashed line 506. Architecture 500 shows a process for creating relationships, such as those shown in FIG. 3 and in FIG. 4, in a structure, such as structure 100 of FIG. 1 and structure 200 of FIG. 2. Architecture 500 of FIG. 5 shows how creating relationships triggers structure reactors (metadata) to start capturing and maintaining data for automatic updating of the structure.

Relationship designer 508 receives input from a user, or from an automatic process, to designate relationships among units, grants, and participants. An example of an operation of a relationship designer is shown in FIG. 3 and FIG. 4. Traversal designer 510 is used to design a traversal of the structure. The results of both relationship designer 508 and traversal designer 510 are saved to metadata store 512.

Metadata store 512 saves models with relationships 514 and traversals 516. Note that metadata store 512 retrieves traversal metadata during run-time 504 in coordination with flex structure traversal service 518. Additionally, the metadata is provided to data pipeline 520 along with SOR data store 522. SOR stands for "system of record." A SOR is a data management term for an information storage system (commonly implemented on a computer system running a database management system) that is the authoritative data source for a given data element or piece of information. SOR data store 522 may include the units, including grants and participants. Referring to date pipeline 520, a data pipeline is the enterprise messaging queue component being used to publish and subscribe to metadata as well as data change events.

The reason metadata is provided to data pipeline 520 along with SOR data 522 is so that any changes in metadata generate a metadata change event that is then published to the messaging queue. The metadata reactor subscribes to this change event and adjusts the SOR reactor configuration so the SOR reactor can properly listen to SOR change events and adjust the graph database "data" as desired.

In turn, data in data pipeline 520 is monitored by flex structure metadata reactor 524. A metadata reactor is program code designed to take action when metadata changes in metadata store 512. Data pipeline 520 is also monitored by flex structure SOR reactor 526, which performs a similar function as flex structure metadata reactor 524 with respect to data in SOR data store 522 instead of metadata store 512. Flex structure metadata reactor 524 may also update a reactor configuration file for flex structure SOR reactor 526.

In turn, flex structure SOR reactor 526 maintains structures in flex structure graph database 528. Flex structure graph database 528 may be a "structure" as defined above. During run-time 504, flex structure traversal service 518 also retrieves structure data for traversals during run-time processing for flex structure graph database 528.

Run-time processing refers to a user initiating a graph database query from the front-end application. The graph database query is typically pre-defined in a custom metadata format called traversal shape, referenced by traversals 516. The traversal shape metadata can be defined via traversal designer 510 and stored in metadata store 512.

When a user initiates a graph database query, the query is forwarded by the front-end application to flex structure traversal service 518. This service will retrieve the appropriate metadata from metadata store 512, generate the native graph database query, and execute that query against flex structure graph database 528. The result set is then returned by the flex structure traversal service to the front-end application.

Figure 6:
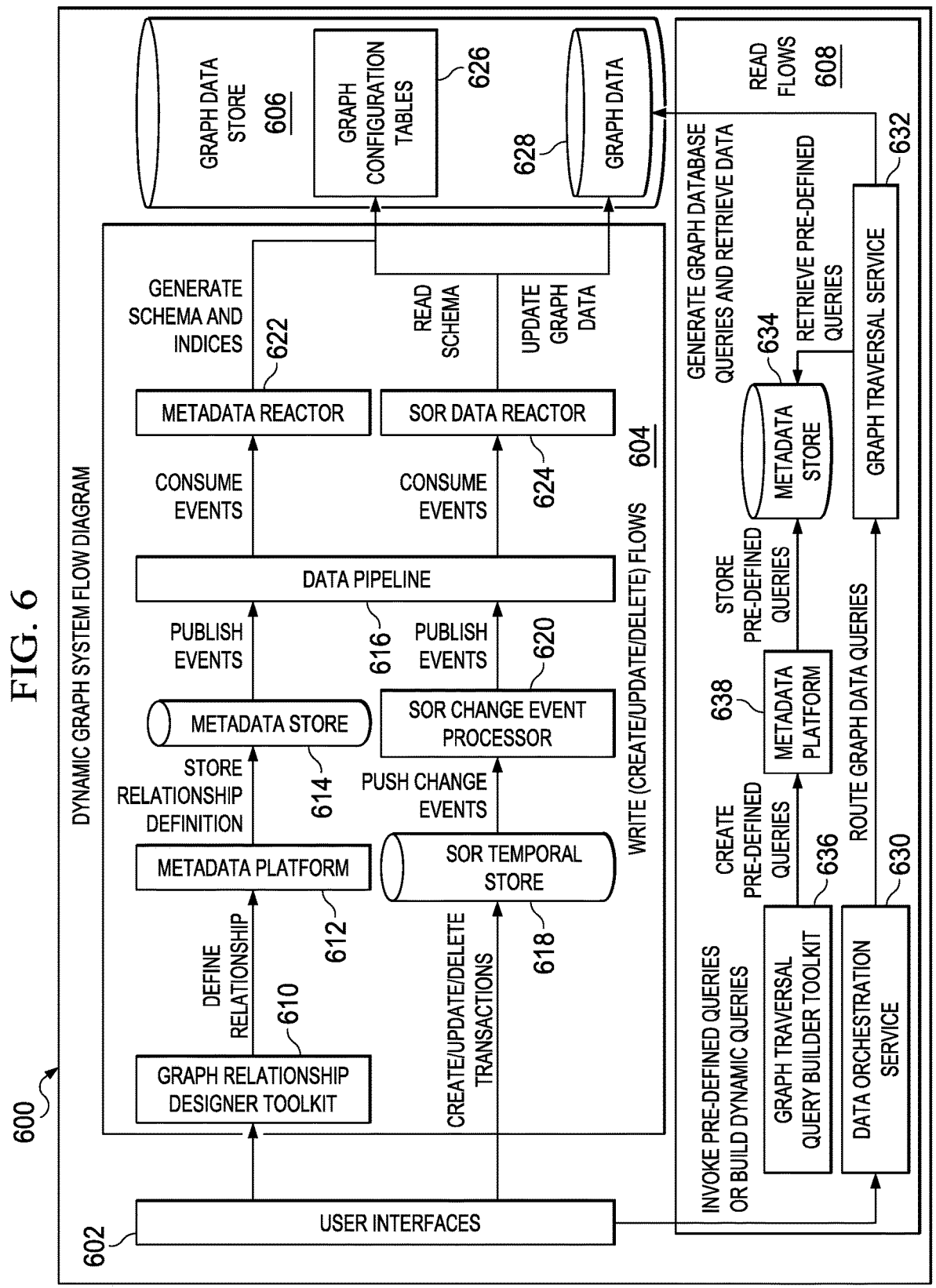
FIG. 6 is a block diagram of another architecture for a novel graph database design in accordance with an illustrative embodiment.

FIG. 6 is a block diagram of another architecture for a novel graph database design in accordance with an illustrative embodiment. Block diagram 600 may be characterized as a dynamic graph system flow diagram. Block diagram 600 shows both systems and actions in the design and operation of a structure, as defined above, and as described with respect to FIG. 1 through FIG. 5.

Block diagram 600 includes four main sections: user interfaces 602, write flows 604, graph data store 606, and read flows 608. User interfaces 602 may be typical user interfaces, such as a keyboard, mouse, graphical user interface (physical display), touch screen, voice interaction, and any other suitable interface for interacting with the computer. User interfaces 602 receive user input, including design of structure traversals, design of the structure, and/or data input, and/or metadata input. User interfaces 602 are used to create flows, that is create, update, and delete flows, as shown in write flows 604. In turn, flows interact with graph data store 606 for the storage and manipulation of the structure. Graph data store in turn is also accessed by user interfaces 602 via read flows 608.

For write flows 604, user interfaces 602 interact with graph relationship designer toolkit 610. Examples of user interfaces for such a toolkit are shown in FIG. 3 and FIG. 4. Graph relationship designer toolkit 610 defines relationships among units in the structure. Write flows 604 also includes metadata platform 612. Metadata platform 612 stores relationship definitions to metadata store 614. In turn, metadata store 614 publishes events to data pipeline 616.

Additionally, for write flows 604, user interfaces 602 also is used to create, update, and/or delete transactions for the various units in the structure to SOR temporal store 618. Again, SOR stands for "system of record." In turn, SOR temporal store 618 pushes change events to SOR change event processor 620, which may be software executed by hardware or may be hardware alone. Like metadata store 614, SOR change event processor 620 publishes events that it generates to data pipeline 616.

Whatever events are published, data pipeline 616 consumes events and provides them to metadata reactor 622 and SOR data reactor 624. Reactors are software programs, or hardware alone, which are programmed to take action in response to events or reactors. Metadata reactor 622 generates schema and indices, and provides them to graph configuration tables 626 in graph data store 606.

The front-end drag and drop designer application, such as described above, generates metadata that defines the relationship (two nodes and an edge) that will be used to form the graph. Examples, using FIG. 2 include Associate Occupies Position or Grants Assigned to Unit. The metadata reactor consumes this relationship metadata and converts it into a proper graph database schema and custom indices. These results will be used by the SOR data reactor to build and maintain the graph data.

SOR data reactor 624 reads schema and provides the result to graph configuration tables 626. SOR data reactor 624 also updates graph data and stores updates in graph data 628. Once metadata reactor 622 generates the graph schema, SOR data reactor 624 will start listening to the relevant SOR change events and maintain the graph data as needed. For example, if there is a new associate record being created in SOR, that event will trigger a message to the SOR reactor. The SOR reactor will understand that a new associates record has just been created, and it will build the "Associate Occupies Position" relationship and link that relationship to its proper place in the graph.

Attention is now turned to read flows 608. Again, user interfaces 602 are used to invoke pre-defined queries or to build dynamic queries. These queries are provided to data orchestration service 630. Data orchestration service 630 routes graph data queries to graph traversal service 632. In turn, graph traversal service 632 accesses metadata store 634, which may be the same or different than metadata store 614 from the write flows. While graph traversal service 632 is described as retrieving pre-defined queries, graph traversal service 632 can also have pre-defined queries pushed to it. Additionally, the pre-defined queries could have been generated automatically by other software, as opposed to being provided by a user.

In addition, when a user designs a query, graph traversal query builder toolkit 636 may be used to create pre-defined queries which may be provided to metadata platform 638. Metadata platform 638, in turn stores pre-defined queries which are provided to metadata store 634. Graph traversal query builder toolkit 636 may be the same suite of software tools as graph relationship designer toolkit 610 from write flows 604. Likewise, metadata platform 638 may be metadata platform 612 from write flows 604.

Returning to graph traversal service 632, this service generates graph database queries and retrieves data to and from graph data 628. Retrieved data and/or query results are stored, provided to a user via user interfaces 602, or both, in a manner similar to that described above.

Figure 7:
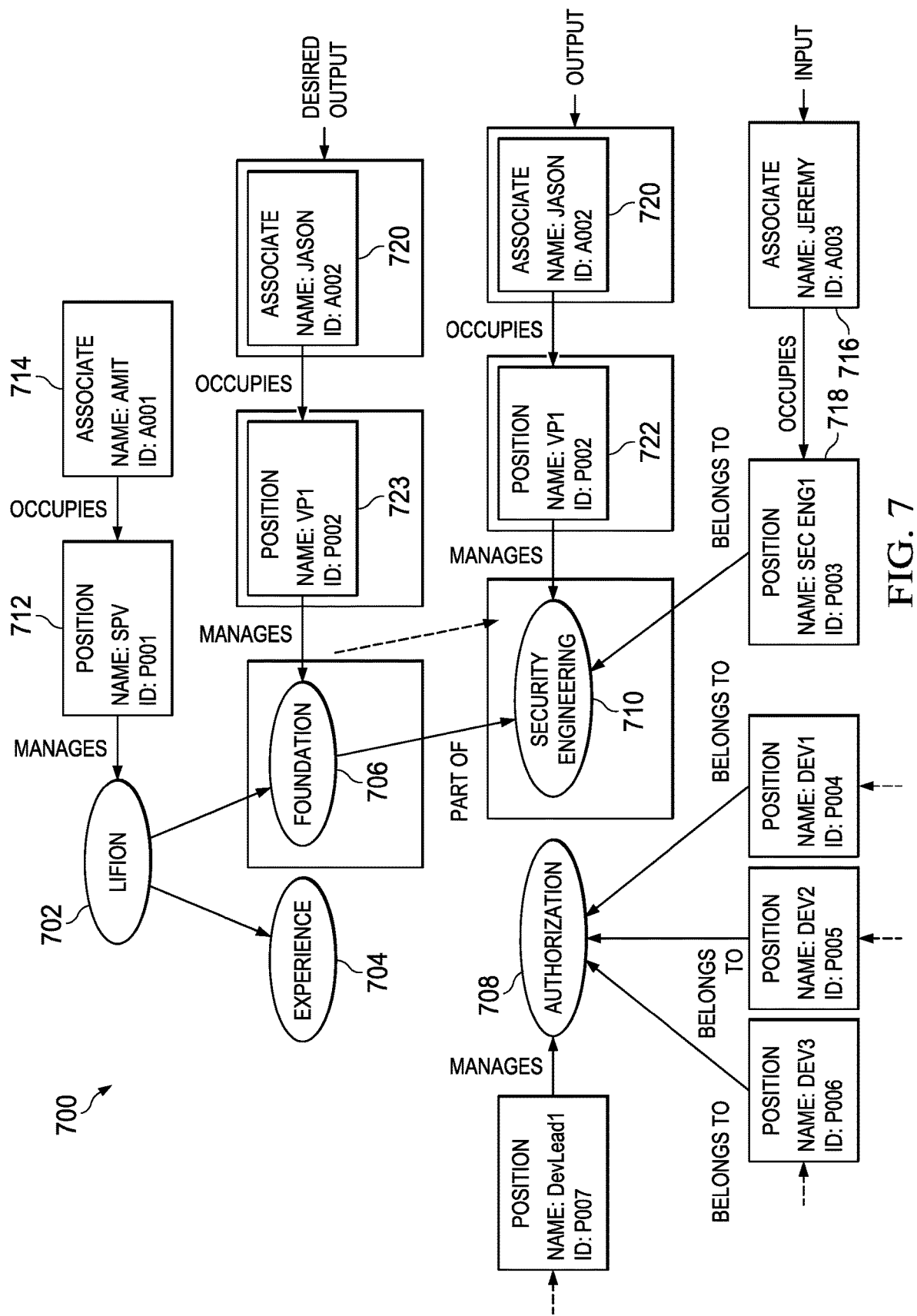
FIG. 7 is a block diagram illustrating a use case of traversal of a novel graph database in accordance with an illustrative embodiment.

FIG. 7 is a block diagram illustrating a use case of traversal of a novel graph database in accordance with an illustrative embodiment. FIG. 7 shows a use case for a structure, such as those defined above with respect to FIG. 1 through FIG. 6. Specifically, FIG. 7 shows a use case in which a user desires to obtain a manager associate's identification from a human resources structure given an associate's identity. For ease of reference, the associate in question shall be named "Jeremy", though no reference to any real person is intended or implied.

Structure 700 includes unit lifion 702, unit experience 704, unit foundation 706, unit authorization 708, and unit security engineering 710, all with relationships as shown by the arrows indicating edges of structure 700. Unit lifion 702 refers to a management node containing management information. Structure 700, in this example, does not contain grants, but it could. Structure 700 includes a significant number of relationships as indicated by the rectangular boxes. For example, associate 714 has an edge (relationship) of "occupies" to position 712, which has an edge (relationship) of "manages" to unit lifion 702.

In this example, the input for a query is the identification of Associate Jeremy 716 A003. Associate Jeremy 716 has an edge of "occupies" with position section engineer 1, or "Sec Eng1" 718, which in turn has an edge of "belongs to" with unit security engineering 710. The reactors in structure 700 receive the query, which also includes the desired information. Again, the desired information is Jeremy's manager's associate identification from human resources structure 700. The query may also return an inherited manager if there is no direct manager.

The computer then traverses structure 700. It returns information that associate Jason 720 (also no resemblance to any real person) "occupies" position VP1 722 which "manages" security engineering 710. Thus, the return on query is that associate Jason 720 with an identification of A002 manages associate Jeremy 716.

Note that associate Jason 720 could have multiple managerial relationships with associate Jeremy 716. For example, associate Jason 720 could "occupy" position 723 which also manages unit foundation 706. In turn, foundation 706 is part of security engineering 710. Thus, associate Jeremy 216 has a managerial relationship with associate Jason 720 via both foundation 706 and security engineering 710. The query result could also include this additional managerial relationship.

The illustrative embodiment described with respect to FIG. 7 is non-exhaustive. Thus, the example described with respect to FIG. 7 does not necessarily limit the claimed inventions.

Figure 8:
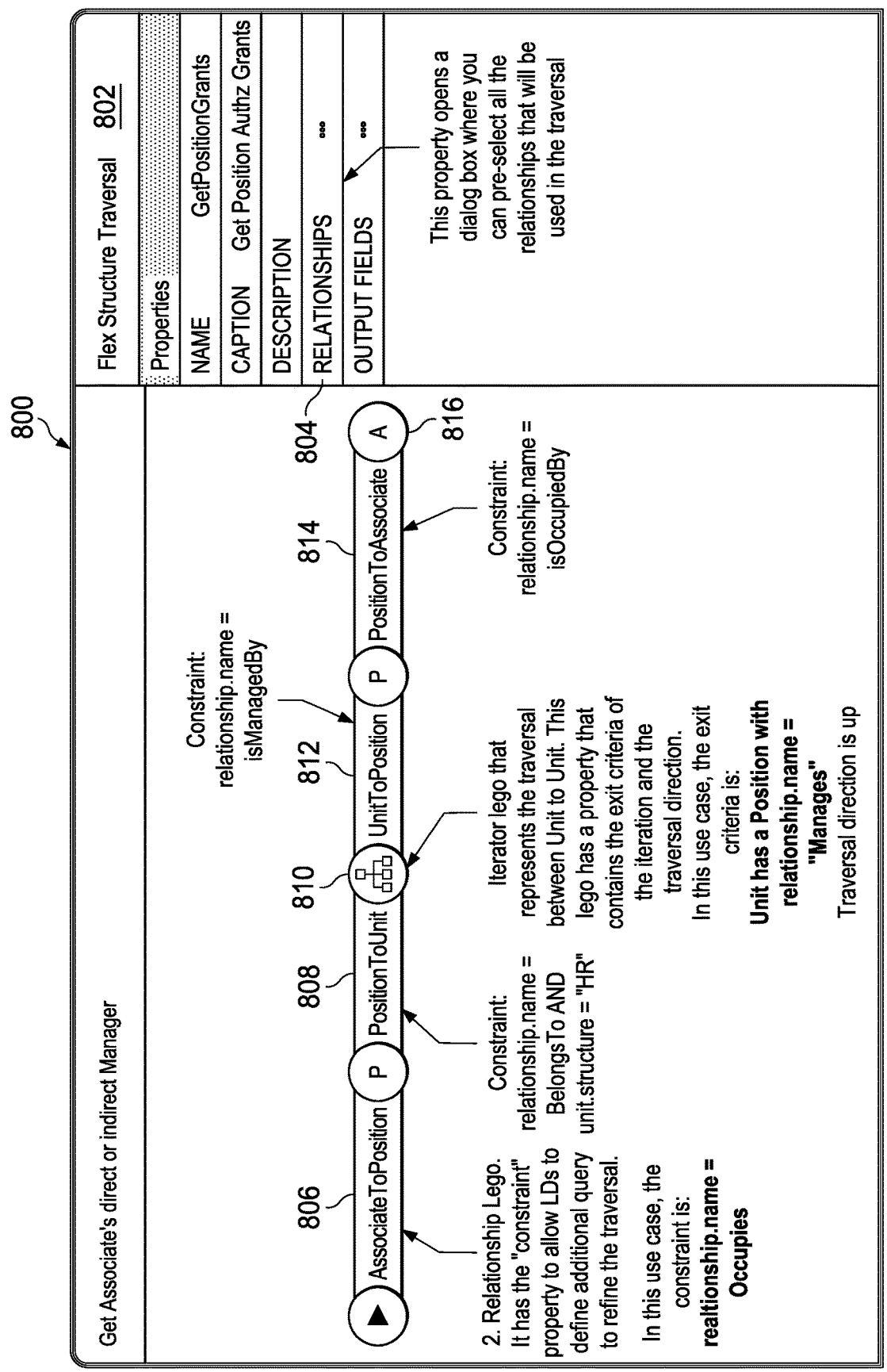
FIG. 8 is a block diagram illustrating design of a command to traverse a novel graph database as shown in FIG. 7 in accordance with an illustrative embodiment.

FIG. 8 is a block diagram illustrating design of a command to traverse a novel graph database as shown in FIG. 6 in accordance with an illustrative embodiment. Block diagram 800 is an extension of the example described with respect to structure 700 of FIG. 7.

Window 802 is an example of a user interface that can be used to accomplish the design described with respect to FIG. 8. Window 802 is part of a user interface, in this example, which shows the flex structure traversal. The property "relationships" 804 is a property that opens a dialog box where a user can pre-select all the relationships that will be used in the traversal. Relationships are defined in a relationship designer, screenshots of which are shown with respect to FIG. 3 and FIG. 4.

The user uses the property to define relationship lego 806. Relationship lego 806 has a "constraint" property to allow application developers to define an additional query to refine the traversal. In this use case, the constraint is "relationship.name=Occupies" and defines an "AssociateToPosition." Next, PositionToUnit lego 808 adds another constraint: relationship.name=BelongsTo AND unit.structure="HR". Iterator lego 810 represents the traversal between unit to unit. This lego has a property that contains the exit criteria of the iteration and the traversal direction. In this use case, the exit criteria is "Unit has a Position with relationship.name="Manages"". Thus, the traversal direction is up in this case.

During the traversal, UnitToPosition lego 812 adds a constraint that relationships.name="isManagedBy" and PositionToAssociate lego 814 adds a constraint that relationship.name="isOccupiedBy". The result is result A 816, which is the manager's associate identification from human resources structure 700 of FIG. 7. The result will return an inherited manager if there is no direct manager.

The illustrative embodiment described with respect to FIG. 8 is non-exhaustive. Thus, the example described with respect to FIG. 8 does not necessarily limit the claimed inventions.

Figure 9:
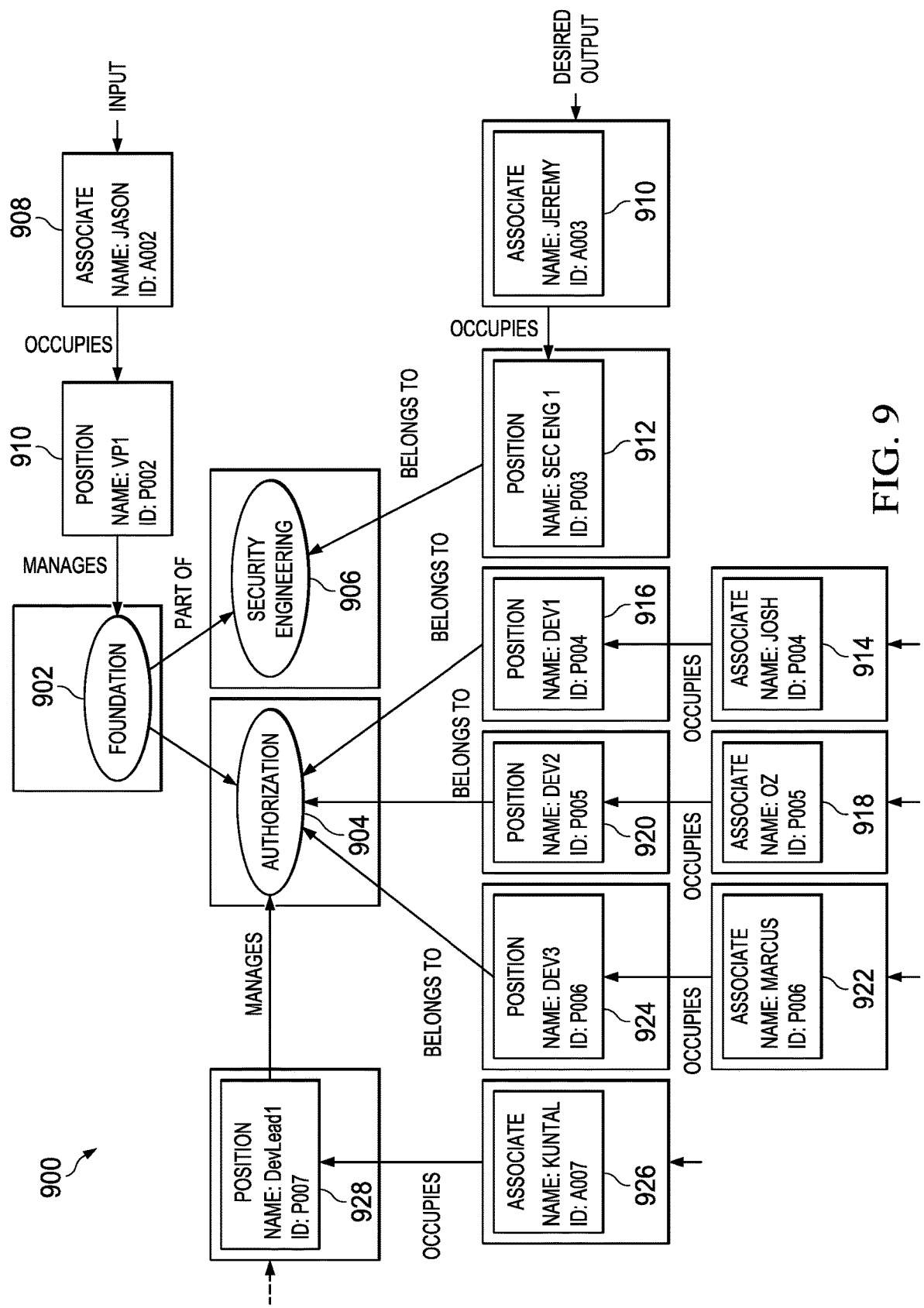
FIG. 9 is a block diagram illustrating a use case of traversal of a novel graph database in accordance with an illustrative embodiment.

FIG. 9 is a block diagram illustrating a use case of traversal of a novel graph database in accordance with an illustrative embodiment. FIG. 9 shows a use case for a structure, such as those defined above with respect to FIG. 1 through FIG. 6, and is a variation of the use case shown in FIG. 7. Specifically, FIG. 9 shows a use case in which a user desires to obtain the identifications of all associates that directly or indirectly report to a manager in a human resources structure. For ease of reference, the manager in question shall be named "Jason". Other managed individuals are also named. Although human names are used for a human resources example, no reference to any real person is intended or implied.

Structure 900 includes unit foundation 902, unit authorization 904, and unit security engineering 906, all with relationships as shown by the arrows indicating edges of structure 900. Associate Jason 908 occupies position VP1 910 which manages unit foundation 902. As with structure 700 of FIG. 7, associate Jeremy 910 occupies position security engineering 1 912, which belongs to security engineering 906.

Additionally, a number of individuals are associated with unit authorization 904. In particular, associate Josh 914 occupies position Dev 1 916 which belongs to unit authorization 904. Associate Oz 918 occupies position Dev 2 920 which belongs to unit authorization 904. Associate Marcus 922 occupies position Dev 3 924 which belongs to unit authorization 904. Associate Kuntal 926 occupies position DevLead1 928 which manages unit authorization 904.

In this use case, the input is Jason's associate identification A002. The output is a list of associate identifications reporting to Jason, which will include A003, A004, A005, A006, and A007.

The illustrative embodiment described with respect to FIG. 9 is non-exhaustive. Thus, the example described with respect to FIG. 9 does not necessarily limit the claimed inventions.

Figure 10:
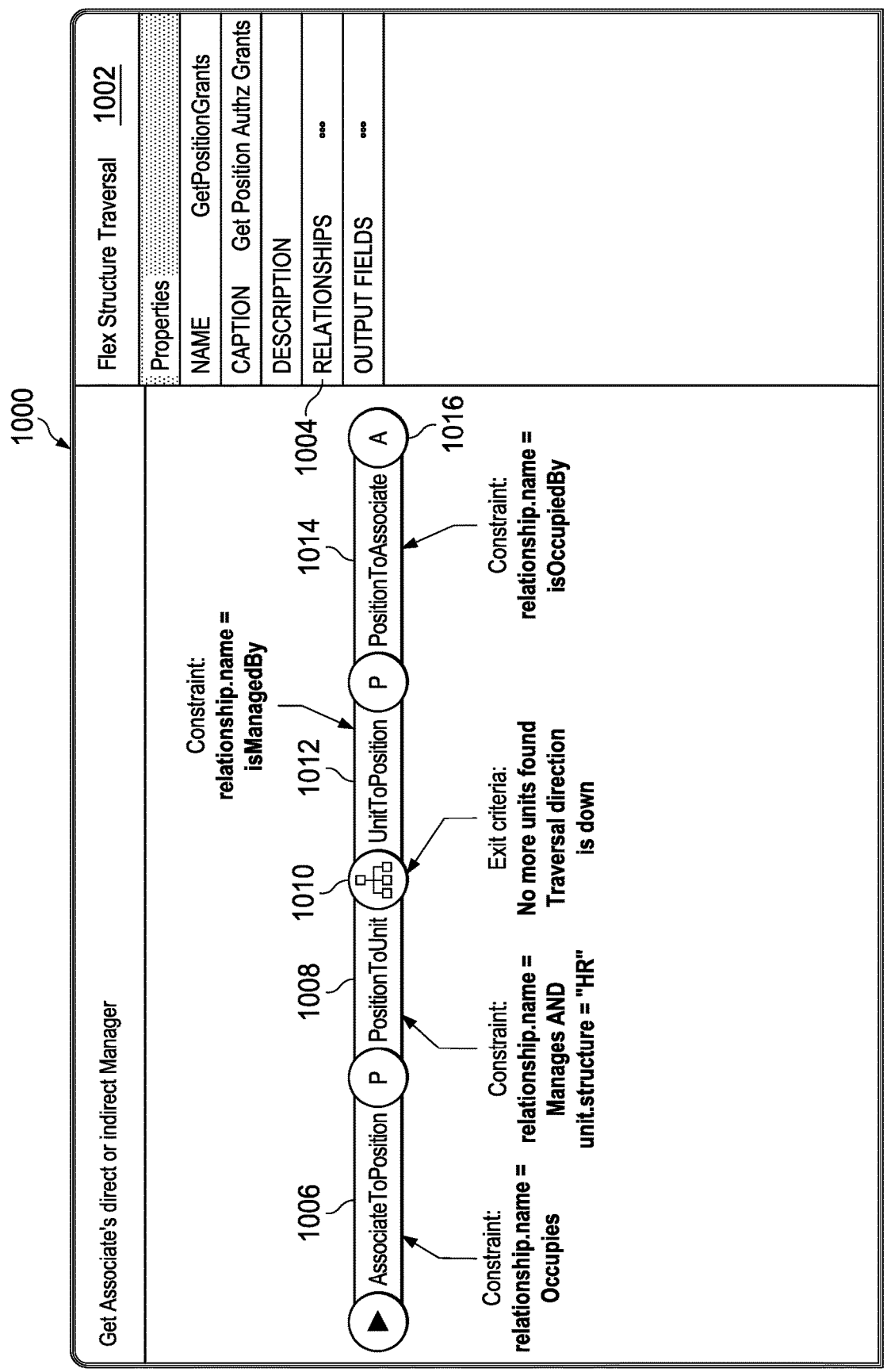
FIG. 10 is a block diagram illustrating design of a command to traverse a novel graph database as shown in FIG. 9 in accordance with an illustrative embodiment.

FIG. 10 is a block diagram illustrating design of a command to traverse a novel graph database as shown in FIG. 9 in accordance with an illustrative embodiment. Block diagram 1000 is an extension of the example described with respect to structure 900 of FIG. 9.

Window 1002 is an example of a user interface that can be used to accomplish the design described with respect to FIG. 10. Window 802 is part of a user interface, in this example, which shows the flex structure traversal. The property "relationships" 1004 is a property that opens a dialog box where a user can pre-select all the relationships that will be used in the traversal. Relationships are defined in a relationship designer, screenshots of which are shown with respect to FIG. 3 and FIG. 4.

The user uses the property to define relationship lego 1006. Relationship lego 1006 has a "constraint" property to allow application developers to define an additional query to refine the traversal. In this use case, the constraint is "relationship.name=Occupies" and defines an "AssociateToPosition". Next, PositionToUnit lego 1008 adds another constraint: relationship.name=Manages AND unit.structure="HR". Iterator lego 1010 represents the traversal between unit to unit. Iterator lego 1010 has a property that contains the exit criteria of the iteration and the traversal direction. In this use case, the exit criteria is "no more units found". Thus, the traversal direction is down in this case.

During the traversal, UnitToPosition lego 1012 adds a constraint that relationships.name="isManagedBy" and PositionToAssociate lego 1014 adds a constraint that relationship.name="isOccupiedBy". The result is result A 1016, which is the identifications of all associates that directly or indirectly report to associate Jason 908 in human resources structure 900 in FIG. 9.

The illustrative embodiment described with respect to FIG. 10 is non-exhaustive. Thus, the example described with respect to FIG. 10 does not necessarily limit the claimed inventions.

Figure 11:
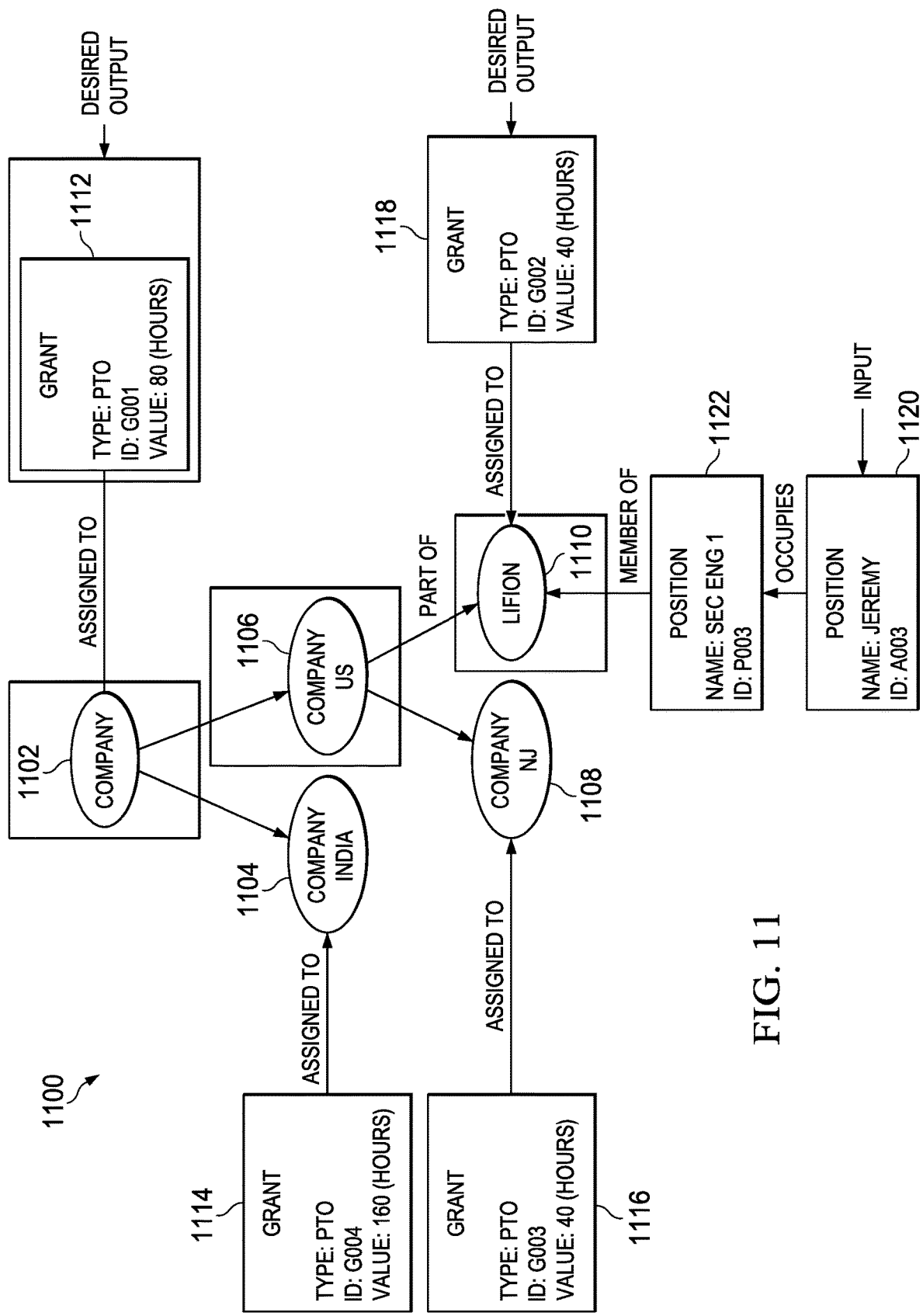
FIG. 11 is a block diagram illustrating a use case of traversal of a novel graph database in accordance with an illustrative embodiment.

FIG. 11 is a block diagram illustrating a use case of traversal of a novel graph database in accordance with an illustrative embodiment. FIG. 11 shows a use case with grants. FIG. 11 shows a use case for a structure, such as those defined above with respect to FIG. 1 through FIG. 6, and is a variation of the use case shown in FIG. 7 and the use case shown in FIG. 9. Specifically, FIG. 11 shows a use case in which a user desires to obtain all of the PTO (paid time off) grants to which the associate is entitled, given an associate's identification. For ease of reference, the associate in question shall be named "Jeremy". Although human names are used for a human resources example, no reference to any real person is intended or implied.

Structure 1100 is a structure for a large organization, which in this example is named "ADP." ADP has an overall unit named unit ADP 1102. Additional units include unit ADP India 1104 and unit ADP US 1106 for subsidiaries of unit ADP 1102. Additional units also include unit ADP NJ 1108 and unit Lifion 1110. The relationships of these units are indicated by the edges represented by arrows.

A variety of different grants are associated with these units. Again, a grant refers to an object that has a relationship to a unit and is applied to all of the participants of the unit. In this case, grant PTO 1112 is assigned to unit ADP 1102. Similarly, grant PTO 1114 is assigned to unit ADP India 1104, grant PTO 1116 is assigned to unit ADP NJ 1108, and grant PTO 1118 is assigned to unit Lifion 1110.

Associate Jeremy 1120 occupies position security engineering 1 1122, which is a member of unit Lifion 1110. Many additional associates could be present, but only this one is presented as the point of this use case is to show a return of all PTO grants to which associate Jeremy 1120 is assigned.

In this use, case the input is the identification number for associate Jeremy 1120, A003. The computer will traverse structure 1100 and return the desired outputs of grant PTO 1112 and grant PTO 1118. Note that grant PTO 1114 and grant PTO 1116 are not returned, because associate Jeremy 1120 is not a member of those two units.

The illustrative embodiment described with respect to FIG. 11 is non-exhaustive. Thus, the example described with respect to FIG. 11 does not necessarily limit the claimed inventions.

Figure 12:
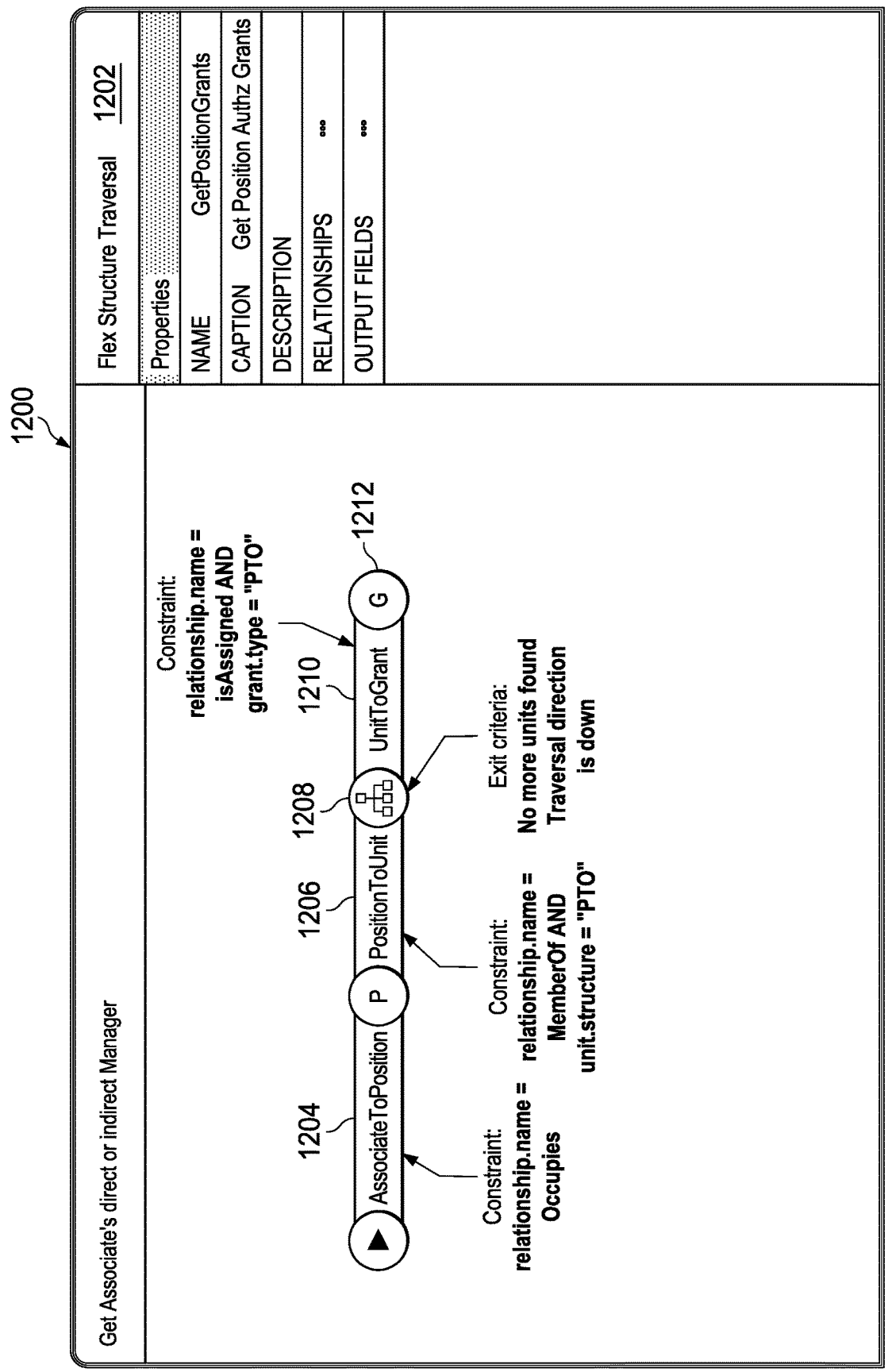
FIG. 12 is a block diagram illustrating design of a command to traverse a novel graph database as shown in FIG. 11 in accordance with an illustrative embodiment.

FIG. 12 is a block diagram illustrating design of a command to traverse a novel graph database as shown in FIG. 12 in accordance with an illustrative embodiment. Block diagram 1200 is an extension of the example described with respect to structure 1100 of FIG. 11.

Window 1202 is an example of a user interface that can be used to accomplish the design described with respect to FIG. 12. Relationships are defined in a relationship designer, screenshots of which are shown with respect to FIG. 3 and FIG. 4.

The user defines relationship AssociateToPosition lego 1204. Relationship AssociateToPosition lego 1204 has a "constraint" property to of relationship.name=Occupies. In this use case, the constraint is "relationship.name=Occupies" and defines an "AssociateToPosition". Next, PositionToUnit lego 1206 adds another constraint: relationship.name=MemberOf AND unit.structure="PTO". Iterator lego 1208 represents the traversal between unit to unit. Iterator lego 1208 has a property that contains the exit criteria of the iteration and the traversal direction. In this use case, the exit criteria is "no more units found". Thus, the traversal direction is down in this case.

During the traversal, UnitToGrant lego 1210 adds a constraint that relationships.name="isAssigned" AND grant.type="PTO". The result is result G 1212, which is the identifications of grants to which associate Jeremy is entitled.

The illustrative embodiment described with respect to FIG. 12 is non-exhaustive. Thus, the example described with respect to FIG. 12 does not necessarily limit the claimed inventions.

Figure 13:
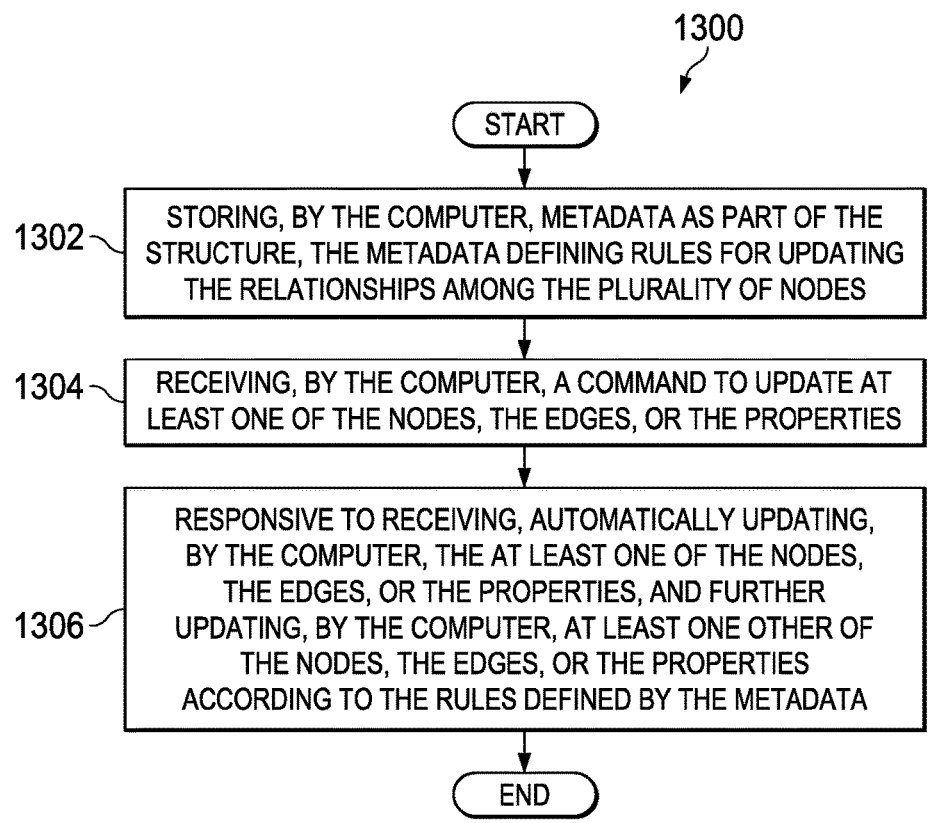
FIG. 13 is a flowchart of a method of improving data retrieval by a computer, the data stored exclusively in the computer as a graph database comprising a plurality of nodes connected by edges, wherein the edges indicate relationships among the plurality of nodes, and wherein the graph database further comprise properties which store information that relate to the plurality of nodes in accordance with an illustrative embodiment.

FIG. 13 is a flowchart of a method of improving data retrieval by a computer, the data stored exclusively in the computer as a graph database comprising a plurality of nodes connected by edges, wherein the edges indicate relationships among the plurality of nodes, and wherein the graph database further comprise properties which store information that relate to the plurality of nodes in accordance with an illustrative embodiment. Method 1300 is a variation of the methods and devices described above with respect to FIG. 1 through FIG. 12. Method 1300 may be executed only by a computer, such as data processing system 1400 of FIG. 14.

Method 1300 may begin storing, by the computer, metadata as part of the structure, the metadata defining rules for updating the relationships among the plurality of nodes (operation 1302). Next, method 1300 also includes receiving, by the computer, a command to update at least one of the nodes, the edges, or the properties (operation 1304). Finally, method 1300 also includes, responsive to receiving, automatically updating, by the computer, the at least one of the nodes, the edges, or the properties, and further updating, by the computer, at least one other of the nodes, the edges, or the properties according to the rules defined by the metadata (operation 1306). In one illustrative embodiment, the method may terminate thereafter.

Method 1300 may be varied. Method 1300 may have more or fewer operations. Method 1300 may have different operations, and variations within a given operation.

For example, in one illustrative embodiment, automatically updating further includes dynamically linking a first node to a second node in the structure according to the rules in the metadata and further based on a property value of one of the first node and the second node. In this case, the first node and the second node were not previously connected by an edge.

In another illustrative embodiment, method 1300 also includes receiving a change to the property value; and automatically updating, based on the rules and the change, at least some edges between the nodes. In yet another illustrative embodiment, method 1300 also includes receiving or generating additional metadata; automatically consuming the additional metadata; and automatically updating the structured based on the additional metadata.

In a different illustrative embodiment, method 1300 may also include dynamically consuming node to node relationship definitions in the structure using the metadata. In still another illustrative embodiment, method 1300 may also include automatically adjusting at least one node relationship to another node based while dynamically receiving changing property values of the another node.

In yet another illustrative embodiment, method 1300 may also include defining the structure. In this case, defining the structure may include defining a grant assigned to a node, wherein the grant is an object that has a relationship to a node that is applied to all participants of the node, and wherein the participants represent a type of actor in the structure that has a relationship to the node. Alternatively, defining the structure may include defining a relationships type for the node, wherein the relationship type comprises a property of a relationship between two objects in the structure that defines the relationship itself. In still another example, defining the structure may include defining a grant assigned to a node, wherein the grant is an object that has a relationship to a node that is applied to all participants of the node, and wherein the participants represent a type of actor in the structure that has a relationship to the node; and defining a relationships type for the node, wherein the relationship type comprises a property of a relationship between two objects in the structure that defines the relationship itself.

In a still different illustrative embodiment, method 1300 may also include defining the metadata. In this case, defining the metadata may also include defining rules for triggering changes among the nodes, the edges, or the properties. In a different case, defining the metadata may include defining rules for starting capture and maintaining of additional data provided to the structure.

In a different illustrative embodiment, for method 1300, the structure stores first information about a team, second information about a plurality of members of the team, and third information about a plurality of additional individuals, wherein the first information includes requirements for being on the team. In this case, the second information includes skills of the plurality of members of the team. The third information includes skills of the plurality of additional individuals. In this case, method 1300 may also include receiving an update to the requirements for the team; and automatically adding ones of the plurality of additional individuals to the team based on the metadata, or automatically subtracting ones of the plurality of members of the team based on the metadata. Yet further, in this case, method 1300 may also include automatically notifying individuals of new team assignments based on the automatically adding, subtracting, or removing.

In yet another illustrative embodiment, for method 1300, the structure stores first information about a team, second information about a plurality of members of the team, and third information about a plurality of additional individuals. In this case, the first information includes requirements for being on the team. The second information includes skills of the plurality of members of the team. The third information includes skills of the plurality of additional individuals. In this case, method 1300 may also include receiving an update to ones of the second information about the plurality of members of the team or receiving an update to ones of the third information including skills of the plurality of additional individuals; and automatically adding ones of the plurality of additional individuals to the team based on the metadata, or automatically subtracting ones of the plurality of members of the team based on the metadata. In a related illustrative embodiment, method 1300 may still further include automatically notifying individuals of new team assignments based on the automatically adding, subtracting, or removing.

In yet another illustrative embodiment, method 1300 may also include periodically traversing, by the computer, the structure for changes to the metadata. In this case, automatically updating includes updating the structure periodically.

The illustrative embodiment described with respect to FIG. 13 is non-exhaustive. Still other variations are possible. Thus, the example described with respect to FIG. 13 does not necessarily limit the claimed inventions.

Figure 14:
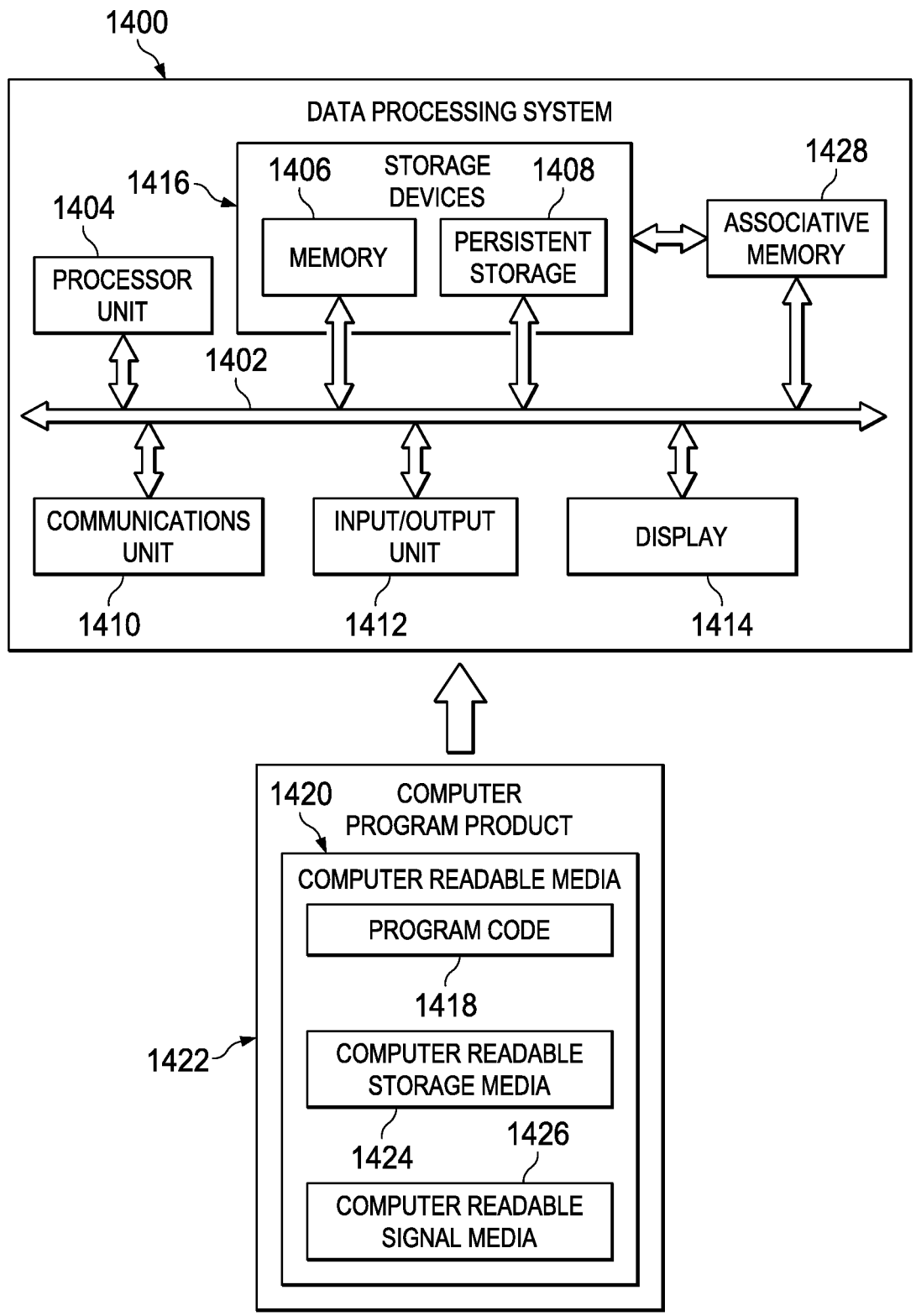
FIG. 14 is a block diagram of a data processing system, in accordance with an illustrative embodiment.

FIG. 14 is a block diagram of a data processing system depicted in accordance with an illustrative embodiment. Data processing system 1400 is an example of a computer as described with respect to FIG. 1 through FIG. 12.

In this illustrative example, data processing system 1400 includes communications framework 1402, which provides communications between processor unit 1404, memory 1406, persistent storage 1408, communications unit 1410, input/output unit 1412, and display 1414. In this example, communication framework may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. The program code may be the software code for carrying out method 1200 of FIG. 12. Storage devices 1416 may also be referred to as computer-readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer-readable media 1420 that is selectively removable and may be loaded onto or transferred to data processing system 1400 for execution by processor unit 1404. Program code 1418 and computer-readable media 1420 form computer program product 1422 in these illustrative examples. In one example, computer readable media 1420 may be computer readable storage media 1424 or computer readable signal media 1426.

In these illustrative examples, computer readable storage media 1424 is a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components, in addition to or in place of those illustrated for data processing system 1400. Other components shown in FIG. 14 can be varied from the illustrative examples shown. The different embodiments may be implemented using any hardware device or system capable of running program code 1418.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Many modifications and variations will be apparent to those of ordinary skill in the art. Further, different illustrative embodiments may provide different features, as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

As used herein, the term "server computer" is any computer which operates in the role of a server, whether or not the computer is configured specifically to operate as a "server." As used herein, the term "client computer" is any computer which operates in the roll of a client, whether or not the computer is configured specifically to operate as a "client" or a "workstation."

What is claimed is:

1. A computer-implemented method comprising:
    improving retrieval of data by a computer:
        storing metadata as part of a structure, wherein:
            the structure comprises:
                a plurality of nodes connected by edges; and
                properties which store information relating to the plurality of nodes; and
            the metadata defines rules for updating relationships among the plurality of nodes including defining rules for both triggering changes among the nodes, the edges or the properties, and starting capture and maintaining of additional data provided to the structure;
    receiving a command to update at least two of:
        at least one of the nodes;
        at least one of the edges; or
        at least one of the properties; and
    responsive to receiving the command, automatically updating the at least one of the nodes, the at least one of the edges, or the at least one of the properties, and further updating at least one other of the nodes, the at least one of the edges, or the at least one of the properties according to the rules defined by the metadata, wherein a first node's relationship to a second node is dynamically adjusted by updating a linkage between the first node and the second node based on a property value of the first node and the rules for both triggering changes among the nodes, the edges or the properties, and starting capture and maintaining of additional data provided to the structure; and
    defining the structure comprising:
        defining a grant assigned to a node, wherein:
            the grant is an object that has a relationship to a node that is applied to all participants of the node; and
            the participants represent a type of actor in the structure that has a relationship to the node; and
        defining a relationships type for the node, wherein the relationship type comprises a property of a relationship between two objects in the structure that defines the relationship itself,
    wherein:
        the structure is stored exclusively in the computer;
        the edges indicate relationships among the plurality of nodes;
        the structure further comprises the properties, which store information relating to the plurality of nodes;
        the structure stores first information about a team, second information about a plurality of members of the team, and third information about a plurality of additional individuals;
        the first information includes requirements for being on the team;
        the second information includes skills of the plurality of members of the team; and
        the third information includes skills of the plurality of additional individuals, and the method further comprises:
            receiving an update to at least one of: the requirements for the team, ones of the second information about the plurality of members of the team, or ones of the third information including skills of the plurality of additional individuals; and
            automatically adding ones of the plurality of additional individuals to the team based on the metadata, or automatically subtracting ones of the plurality of members of the team based on the metadata.

2. The computer-implemented method of claim 1, wherein:
    automatically updating further comprises dynamically linking a first node to another node in the structure according to the rules in the metadata based on a property value of one of the first node and the second node; and
    the first node and the second node are not connected by an edge prior to automatic updating.

3. The computer-implemented method of claim 2 further comprising:
   receiving a change to the property value; and
   automatically updating, based on the rules and the change, at least some edges between the nodes.

4. The computer-implemented method of claim 1 further comprising:
   receiving or generating additional metadata;
   automatically consuming the additional metadata; and
   automatically updating the structure based on the additional metadata.

5. The computer-implemented method of claim 1 further comprising:
   dynamically consuming node-to-node relationship definitions in the structure using the metadata.

6. The computer-implemented method of claim 1 further comprising:
   automatically adjusting at least one node relationship to another node based on dynamically receiving changing property values of the another node.

7. The computer-implemented method of claim 1, wherein defining the structure comprises:
   defining a grant assigned to a node, wherein:
      the grant is an object that has a relationship to a node that is applied to all participants of the node; and
      the participants represent a type of actor in the structure that has a relationship to the node.

8. The computer-implemented method of claim 7, wherein defining the structure further comprises:
   defining a relationship type for the node, wherein the relationship type comprises a property of a relationship between two objects in the structure that defines the relationship itself.

9. The computer-implemented method of claim 1 further comprising:
   defining the metadata.

10. The computer-implemented method of claim 9, wherein defining the metadata comprises:
    defining rules for triggering changes among the nodes, the edges, or the properties.

11. The computer-implemented method of claim 10, wherein defining the metadata further comprises:
    defining rules for starting capture and maintaining additional data provided to the structure.

12. The computer-implemented method of claim 1 further comprising:
    automatically notifying individuals of new team assignments based on automatic addition, subtraction, or removal.

13. The computer-implemented method of claim 1 further comprising:
    periodically traversing, by the computer, the structure for changes to the metadata, wherein automatic updating includes updating the structure periodically.

14. A computer comprising:
    a processor; and
    a non-transitory, computer-recordable storage medium including instructions for improving data retrieval, wherein:
       the data is stored exclusively as a structure comprising a plurality of nodes connected by edges;
       the edges indicate relationships among the plurality of nodes;
       the structure further comprises properties which store information relating to the plurality of nodes; and
    the instructions comprise:
       first program code for storing metadata as part of the structure, wherein the metadata defines rules for updating the relationships among the plurality of nodes including defining rules for both triggering changes among the nodes, the edges or the properties, and starting capture and maintaining of additional data provided to the structure;
       second program code for receiving a command to update at least two of at least one of the nodes, at least one of the edges, or at least one of the properties; and
       third program code for, responsive to receiving the command, automatically updating the at least one of the nodes, the at least one of the edges, or the at least one of the properties, and further updating at least one other of the at least one of the nodes, the at least one of the edges, or the at least one of the properties according to the rules defined by the metadata, wherein a first node's relationship to a second node is dynamically adjusted by updating a linkage between the first node and the second node based on a property value of the first node and the rules for both triggering changes among the nodes, the edges or the properties, and starting capture and maintaining of additional data provided to the structure; and
       fourth program code for defining the structure comprising:
          defining a grant assigned to a node, wherein:
             the grant is an object that has a relationship to a node that is applied to all participants of the node; and
             the participants represent a type of actor in the structure that has a relationship to the node; and
          defining a relationships type for the node, wherein the relationship type comprises a property of a relationship between two objects in the structure that defines the relationship itself,
       wherein:
          the structure is stored exclusively in the computer;
          the edges indicate relationships among the plurality of nodes;
          the structure further comprises the properties, which store information relating to the plurality of nodes;
          the structure stores first information about a team, second information about a plurality of members of the team, and third information about a plurality of additional individuals;
          the first information includes requirements for being on the team:
          the second information includes skills of the plurality of members of the team; and
          the third information includes skills of the plurality of additional individuals, and
       the instructions further comprise:
          fifth program code for receiving an update to at least one of: the requirements for the team, ones of the second information about the plurality of members of the team, or ones of the third information including skills of the plurality of additional individuals; and
          sixth program code for automatically adding ones of the plurality of additional individuals to the team based on the metadata, or automatically subtracting ones of the plurality of members of the team based on the metadata.

15. The computer of claim 14 further comprising:
seventh program code for defining the metadata.

16. The computer of claim 15, wherein defining the metadata comprises:
defining rules for triggering changes among the nodes, the edges, or the properties.

17. The computer of claim 16, wherein defining the metadata further comprises:
defining rules for starting capture and maintaining additional data provided to the structure.

18. A computer program product comprising:
a computer-readable storage media including instructions for dynamically updating a data structure, wherein:
the data structure comprises a plurality of nodes connected by edges;
the edges indicate relationships among the plurality of nodes;
the data structure further comprises properties which store information relating to the plurality of nodes; and
the instructions comprise:
first program code for storing, by a computer, metadata as part of the data structure, wherein the metadata defines rules for updating the relationships among the plurality of nodes including defining rules for both triggering changes among the nodes, the edges, or the properties, and starting capture and maintaining of additional data provided to the structure;
second program code for receiving, by the computer, a command to update at least two of at least one of the nodes, at least one of the edges, or at least one of the properties; and
third program code for, responsive to receiving the command, automatically updating, by the computer, the at least one of the at least one of the nodes, the at least one of the edges, or the at least one of the properties, and further updating, by the computer, at least one other of the at least one of the nodes, the at least one of the edges, or the at least one of the properties according to the rules defined by the metadata, wherein a first node's relationship to a second node is dynamically adjusted by updating a linkage between the first node and the second node based on a property value of the first node and the rules for both triggering changes among the nodes, the edges or the properties, and starting capture and maintaining of additional data provided to the structure; and fourth program code for defining the structure comprising:
defining a grant assigned to a node, wherein:
the grant is an object that has a relationship to a node that is applied to all participants of the node; and
the participants represent a type of actor in the structure that has a relationship to the node; and
defining a relationships type for the node, wherein the relationship type comprises a property of a relationship between two objects in the structure that defines the relationship itself,
wherein:
the structure is stored exclusively in the computer;
the edges indicate relationships among the plurality of nodes;
the structure further comprises the properties, which store information relating to the plurality of nodes;
the structure stores first information about a team, second information about a plurality of members of the team, and third information about a plurality of additional individuals;
the first information includes requirements for being on the team;
the second information includes skills of the plurality of members of the team; and
the third information includes skills of the plurality of additional individuals, and
the instructions further comprise:
fifth program code for receiving an update to at least one of: the requirements for the team, ones of the second information about the plurality of members of the team, or ones of the third information including skills of the plurality of additional individuals; and
sixth program code for automatically adding ones of the plurality of additional individuals to the team based on the metadata, or automatically subtracting ones of the plurality of members of the team based on the metadata.

19. The computer program product of claim 18 further comprising:
seventh program code for defining the metadata.

20. The computer program product of claim 19, wherein defining the metadata comprises:
defining rules for triggering changes among the nodes, the edges, or the properties.

21. The computer program product of claim 20, wherein defining the metadata further comprises:
defining rules for starting capture and maintaining additional data provided to the structure.

* * * * *